US006179702B1

(12) United States Patent
Hazenbroek

(10) Patent No.: US 6,179,702 B1
(45) Date of Patent: Jan. 30, 2001

(54) ROTARY SHACKLE WITH POSITION LOCK

(75) Inventor: Jacobus E. Hazenbroek, Klaaswaal (NL)

(73) Assignee: SystemateHolland, B.V., Numansdorp (NL)

(*) Notice: Under 35 U.S.C. 154(b), the term of this patent shall be extended for 0 days.

(21) Appl. No.: 09/181,099

(22) Filed: Oct. 28, 1998

Related U.S. Application Data

(60) Provisional application No. 60/074,915, filed on Feb. 17, 1998.

(51) Int. Cl.[7] .................................................. A22C 21/00
(52) U.S. Cl. ............................................ 452/188; 452/179
(58) Field of Search ........................... 452/188, 187, 452/179

(56) References Cited

U.S. PATENT DOCUMENTS

| 3,518,717 | 7/1970 | Johnson et al. | |
|---|---|---|---|
| 4,180,152 | 12/1979 | Sefeik | 198/377 |
| 5,092,815 | * 3/1992 | Polkinghorne | 452/179 |
| 5,366,406 | * 11/1994 | Hobbel et al. | 452/179 |
| 5,487,700 | * 1/1996 | Dillard | 452/188 |
| 5,505,657 | * 4/1996 | Janssen et al. | 452/188 |

FOREIGN PATENT DOCUMENTS

| 0 444 782 A1 | 1/1991 | (EP) . |
|---|---|---|
| 0 786 208 A1 | 1/1997 | (EP) . |

* cited by examiner

*Primary Examiner*—Willis Little
(74) *Attorney, Agent, or Firm*—Thomas, Kayden, Horstemeyer & Risley

(57) ABSTRACT

The rotary bird hanger 30 includes a turning gear 38 having on its upper surface a lock collar 42, with lock notches 50 formed at intervals about the lock collar 42. The non-rotatable hanger support 32 includes a cam lock 62 movably supported by the hanger support 32 and a lock pin 82 engagable with the lock notches 50 of the hanger turning gear 38. Cams 78 are positioned along the processing path for engaging the cam lock 62 and for releasing the lock pin 82 from a lock notch 50, thereby permitting the rotary bird hanger 30 to rotate with respect to the hanger support 32 such that the lock pin 82 can engage others of the lock notches 50 to secure the rotational movement of the hanger 30 until the cam lock 62 engages additional cams 78 along the processing path.

10 Claims, 3 Drawing Sheets

ROTARY SHACKLE WITH POSITION LOCK

CROSS-REFERENCE TO RELATED APPLICATIONS

This application is based on and claims priority to U.S. provisional application, Ser. No. 60/074,915, filed on Feb. 17, 1998.

BACKGROUND OF THE INVENTION

1. Field of the Invention

This invention relates to a suspended conveyor line of a poultry processing plant, wherein birds are suspended by their legs on shackles or poultry hanger assemblies, and the shackles carry the bird along a processing path where the birds are, for example, cut apart. More particularly, the invention relates to a rotary bird hanger assembly which can be rotated so as to present the bird in different positions to the cut up equipment, etc.

2. Description of Related Art

In modern poultry processing plants, chickens, turkeys and other birds raised for commercial slaughter are moved through a poultry processing line where they are sequentially defeathered, eviscerated, cut up, and packaged for shipment to wholesale and retail consumers. In such a plant, it is common for the poultry carcasses to be suspended by their legs from a suspended shackle conveyor. The conveyor typically includes a suspended conveyor rail and a series of bird support shackles, each of which includes a trolley for rolling along the conveyor rail and a bird hanger suspended below the trolley, with a drive chain connecting the shackles in equally spaced series. The bird hangers have a pair of spaced depending stirrups that are configured to receive and releasably hold the hocks of the birds.

With this arrangement, the workers can suspend birds by their legs or hocks from the shackles by slipping their hocks into the stirrups. The spaced suspension of the birds along the conveyor system allows the birds to be moved sequentially through the various processing stations, such as cut up machines, for serial processing of large numbers of the carcasses.

As poultry carcasses are processed at the various processing stations of the poultry line, the carcasses are turned to present the carcasses in various attitudes to the different processing machinery to accommodate each of the processing steps. In some of these stations, it is desirable to present the carcass breast first, and other stations back first, and still other stations side first. In order to turn the bird, poultry shackles have been developed which include a lower bird hanger that is rotatably mounted to the trolley assembly, and a turning gear mounted to the bird hanger. The turning gear typically has slots formed therein that engage turning pins spaced at predetermined intervals along the poultry processing path, so that when a slot of a turning gear reaches the turning pin, the turning gear "walks around" the turning pin, so as to rotate the bird hanger approximately 90°.

In order to keep the bird hanger from inadvertently rotating with respect to the trolley assembly, the turning gear typically includes flat surfaces about its periphery, and these flat surfaces are arranged to move adjacent guide rails extending parallel to and straddling the turning gear, so that no inadvertent turning of the bird hanger occurs. An example of this type of rotary shackle is disclosed in U.S. Pat. No. 5,487,700.

While the above described rotary shackles have met with success in the poultry processing industry, there are times when a poultry conveyor system must be able to move the poultry shackles up and down inclines, around curves, and about combinations of curves and inclines. While the prior art turning gears and guide rails are effective to retain the bird hanger of a poultry shackle in an approximately fixed attitude along rectilinear runs of a conveyor system, the turning gears and their necessary guide rails are more difficult to construct and operate for movement of the shackles about curves and into inclines of the processing path, and the guide rails typically are interrupted at the positions along the path where the shackles negotiate a turn, etc. Therefore, it has been customary to move poultry shackles at certain intervals through a processing line without using the guide rails to maintain the poultry shackles in a fixed attitude.

U.S. Pat. No. 5,092,815 illustrates a rotary shackle assembly which has a spring loaded ball bearing that registers with a detent which tends to hold the shackle in a non-rotary position with respect to its trolley; however, the ball and detent arrangement provides only a light restraining force to the tendency of the shackle to rotate with respect to its trolley, and the absence of a firm lock does not solve the problem of inadvertent rotation of the poultry carcass with respect to its trolley during those spans of the trolley system where the shackle is being elevated or turned. Also, this type of system still requires the guide rails at the processing stations.

Thus, it can be understood that it would be desirable to have a releasable lock system for a rotary shackle of a poultry processing line, whereby the shackle can be freely rotated with respect to its trolley at predetermined positions along the processing line, and can be firmly held against rotation at all other positions along the processing line without the use of external guide rails.

BRIEF SUMMARY OF THE INVENTION

Briefly described, the present invention comprises a poultry processing conveyor system which includes a suspended conveyor track, a plurality of poultry hanger assemblies movable along the conveyor track by means of a continuous conveyor chain connected to each hanger assembly, and trolley assemblies connected to and supporting said conveyor chain and movable along the suspended track. The hanger assemblies each include a hanger support and bird hanger rotatably connected to the hanger support for carrying birds to be processed through a series of work stations. A turning gear is mounted to the bird hanger having slots formed therein for engagement with turning pins at predetermined positions along the processing line for turning the bird hanger with respect to the trolley assembly, to reorient the bird with respect to the direction of movement of the bird along the processing path. If desired, rectilinear guide rails are positioned along the path of the turning gear in the vicinity of a processing machine, so that the bird hanger, and therefore the bird suspended from the hanger, are stabilized in the rectilinear movement of the bird through the processing station, so that the work on the bird will not inadvertently rotate the bird hanger with respect to its trolley.

The bird hanger includes a lock collar having an inwardly facing circular track with locking notches formed at 90° intervals thereabout. The trolley assembly includes a cam actuated lock that has a pin for registering with one of the locking notches of the hanger. The cam actuated lock is engaged by cams at the turning stations along the processing line, so that each cam unlocks the hanger with respect to the trolley assembly. At the same time, the turning gear of the hanger engages a stationary pin along the processing line, and the turning gear tends to "walk around" the turning pin, so as to turn the hanger 90°. Once the hanger has begun its turning movement, the trolley advances beyond the cam, so that the cam lock is released and its locking pin moves back toward engagement of the inwardly facing surface of the lock collar and registers with the next locking notch of the locking collar, to firmly hold the hanger in its newly acquired position.

Therefore, it is an object of this invention to provide an improved poultry processing fine along which suspended poultry support shackles move in series, with the bird hangers of the shackles being rotatable with their supporting trolleys, and with the rotary positions of the bird hangers being stabilized both while the suspended bird of the shackle is being moved through a cut-up machine or other processing machine, and while the shackle is changing directions between processing stations, as by traversing inclines or curves along the processing path.

Another object of this invention is to provide a secure locking means engaged between the turning gear of a hanger and the hanger support, which is engagable by a cam to unlock the hanger from the hanger support at positions along the poultry processing line where rotary movement is required between the hanger and the hanger support, to turn a bird to a new attitude.

Another object of this invention is to provide an improved poultry shackle for suspending birds by their legs as the birds are moved along a poultry processing line, which includes a locking device engaged between a bird hanger and its hanger support, which maintains the bird hanger in predetermined relative rotary positions, and which can be unlocked to allow rotation of the bird with respect to the trolley at predetermined locations along the processing path.

Other objects, features and advantages of the present invention will become apparent upon reading the following specification, when taken in conjunction with the accompanying drawings.

DETAILED DESCRIPTION OF THE INVENTION

Figure 1:
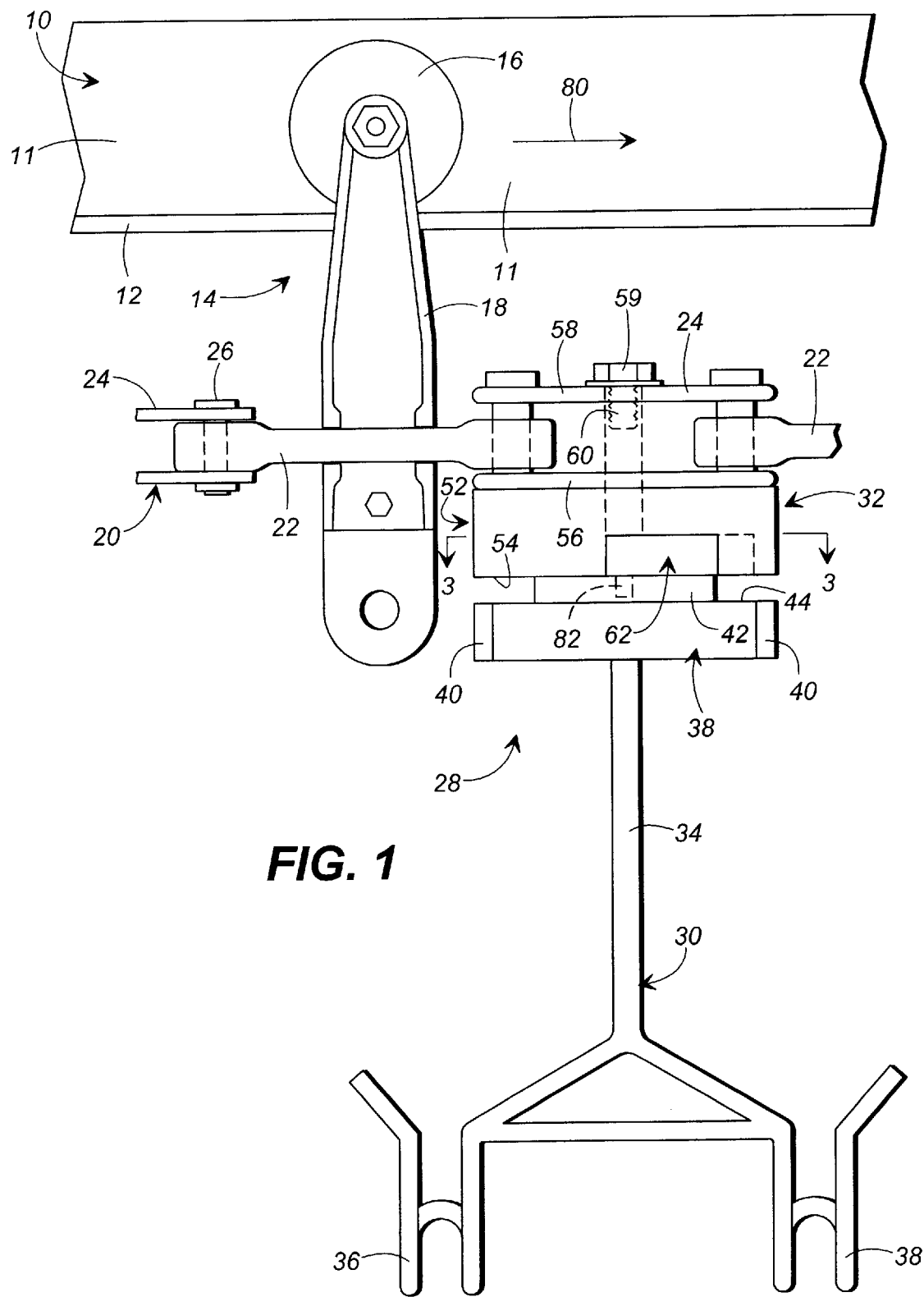
FIG. 1 is a side elevation view of a shackle of a suspended poultry conveyor system, showing the trolley and the bird hanger.

Referring now in more detail to the drawings in which like numerals indicate like parts throughout the several views, FIG. 1 shows an elongated conveyor rail 10 which is, in cross section, an inverted T-shape, having a central web 11 and a horizontal extending platform 12 which protrudes on opposite sides of the web 11, and forms a platform for the wheels of a trolley.

A trolley assembly 14 is movably mounted to rail 10, and includes a pair of wheels 16 (only one shown), which straddle the web 11 of the rail 10, and which ride along the platform 12. A support yoke 18 has a pair of arms 19 (only one shown) that straddle the rail 10 that are rotatably connected at their upper ends to wheels 16. The lower portion of support yoke 18 is connected to a continuous conveyor chain 20.

Conveyor chain 20 is made up of a series of chain links, with alternate ones of the links 22 being of monolithic construction, and with the other alternate links 24 being assembled and connected at their ends to the ends of the links 22 by connector pins 26.

A plurality of hanger assemblies 28 (only one shown) are connected to the conveyor chain at predetermined intervals along the length of the conveyor chain. Each hanger assembly includes a rotatable bird hanger 30 and a non-rotatable hanger support 32.

The lower portion of each hanger 30 is of conventional construction, including a vertical support stem 34, and a pair of stirrups 36 and 38 which are open at their upper ends for receiving the joint of the leg of a poultry carcass, such as the leg of a chicken. The stirrups are spaced apart so as to spread the legs of the bird sufficiently for performing various poultry harvesting processing steps, such as cutting the parts of the bird from the carcass.

The bird hanger includes the upper end of its vertical support stem 34 a turning gear 38 which is rigidly mounted by a connector pin or other conventional means to the support stem 34.

Figure 2:
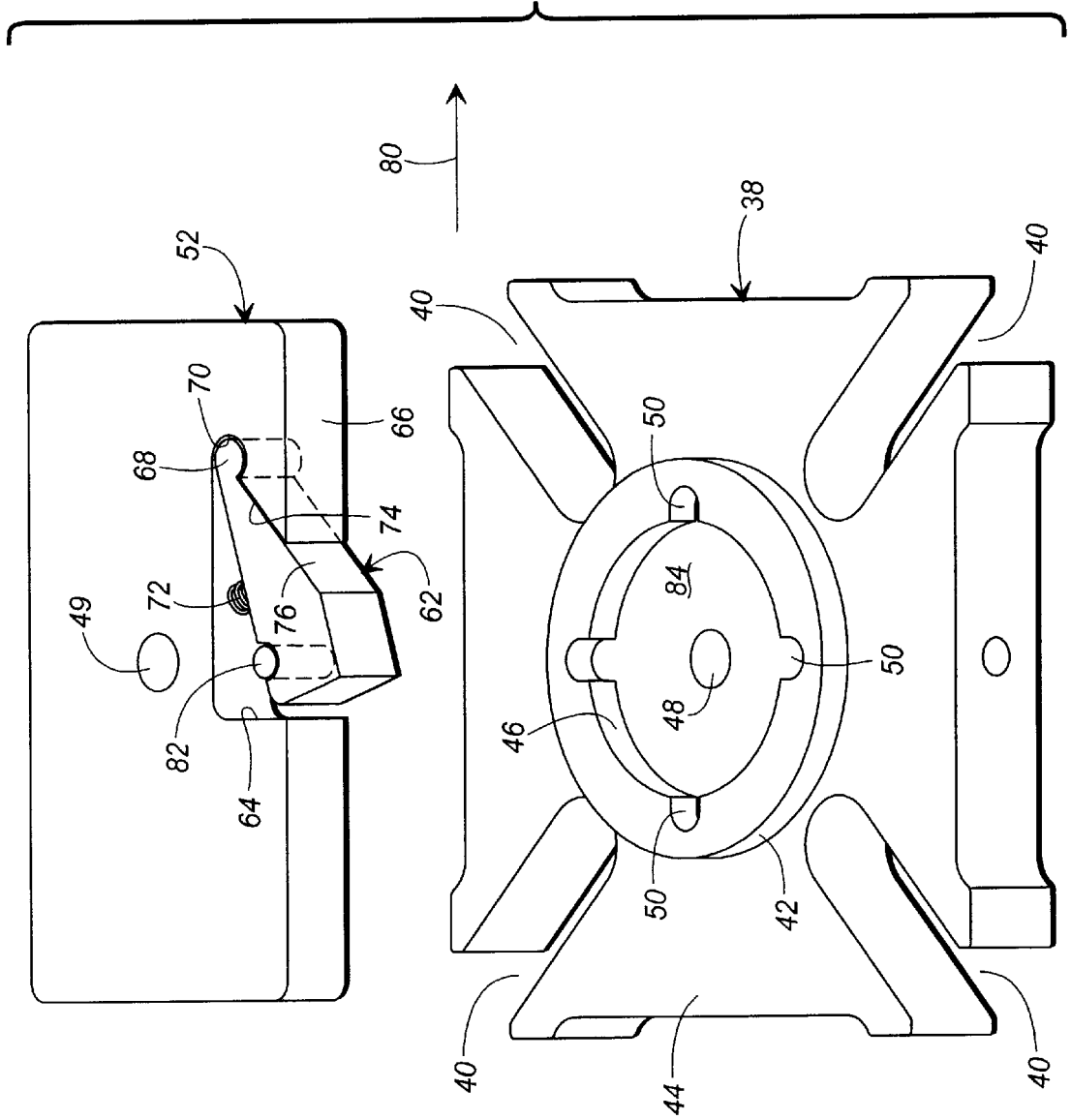
FIG. 2 is an expanded perspective illustration of the turning gear of a hanger and the lock.

As illustrated best in FIG. 2, turning gear 38 is approximately square with turning recesses 40 formed at each corner of the square shape, with a lock collar 42 extending from the upper surface 44 of the turning gear 38. Lock collar 42 is formed on the upper surface of turning gear 38 and has an inwardly facing circular surface 46 that concentrically surrounds the central stem opening 48 which accommodates the stem 34 of the hanger 30. A plurality of lock notches 50 are formed in the inwardly facing circular surface 46 of lock collar 42, with the lock notches 50 being formed at 90° intervals about the lock collar 42, thereby forming four lockable rotational positions of the hanger 30 relative to the hanger support 32.

Hanger support 32, which functions as a cam lock holder is rigidly mounted to an assembled chain link 24 by welding or other conventional fastening means. Hanger support 32 is rectangular, and its bottom surface 54 engages lock collar 42 of turning gear 38. Vertical support stem 34 of the rotatable bird hanger 30 extends upwardly through the opening 48 of turning gear 38 and through the opening 49 of hanger support 32 through the plates 56 and 58 of assembled chain link 24, and is rotatably held in place by a conventional fastener, such as an externally threaded nut 59 extending from above the upper link 58 downwardly into and in engagement with the internal threads 60 of the upper end of the vertical support stem 34. Cam lock 62, which functions as a means for locking the rotatable bird hanger 30 with respect to the non-rotatable hanger support 32, is pivotally positioned in cam lock recess 64 which extends inwardly of the side surface 66 of the cam hanger support 32. The semi-cylindrical pivot end 68 of the cam lock 62 is received in a similarly shaped semi-cylindrical recess 70 of the cam lock recess 64. The recess 64 is larger in breadth than the breadth of cam lock 62, so that the cam lock can pivot about its semi-cylindrical pivot end. A coil compression spring 72 urges cam lock 62 toward engagement with stop surface 74 of cam lock recess 64. Cam engagement surface 76 extends outwardly beyond the side surface 66 of hanger support 32, so that it can be engaged by a cam 78 (FIG. 3) as the trolley assembly 14 moves the hanger assembly 28 along the processing path, in the direction as indicated by arrows 80.

Lock pin 82 projects downwardly from cam lock 62 into the circular recess 84 formed by lock collar 42 of turning gear 38. Lock pin 82 is sized and shaped so as to be received in each of the lock notches 50 of lock collar 42.

Figure 3:
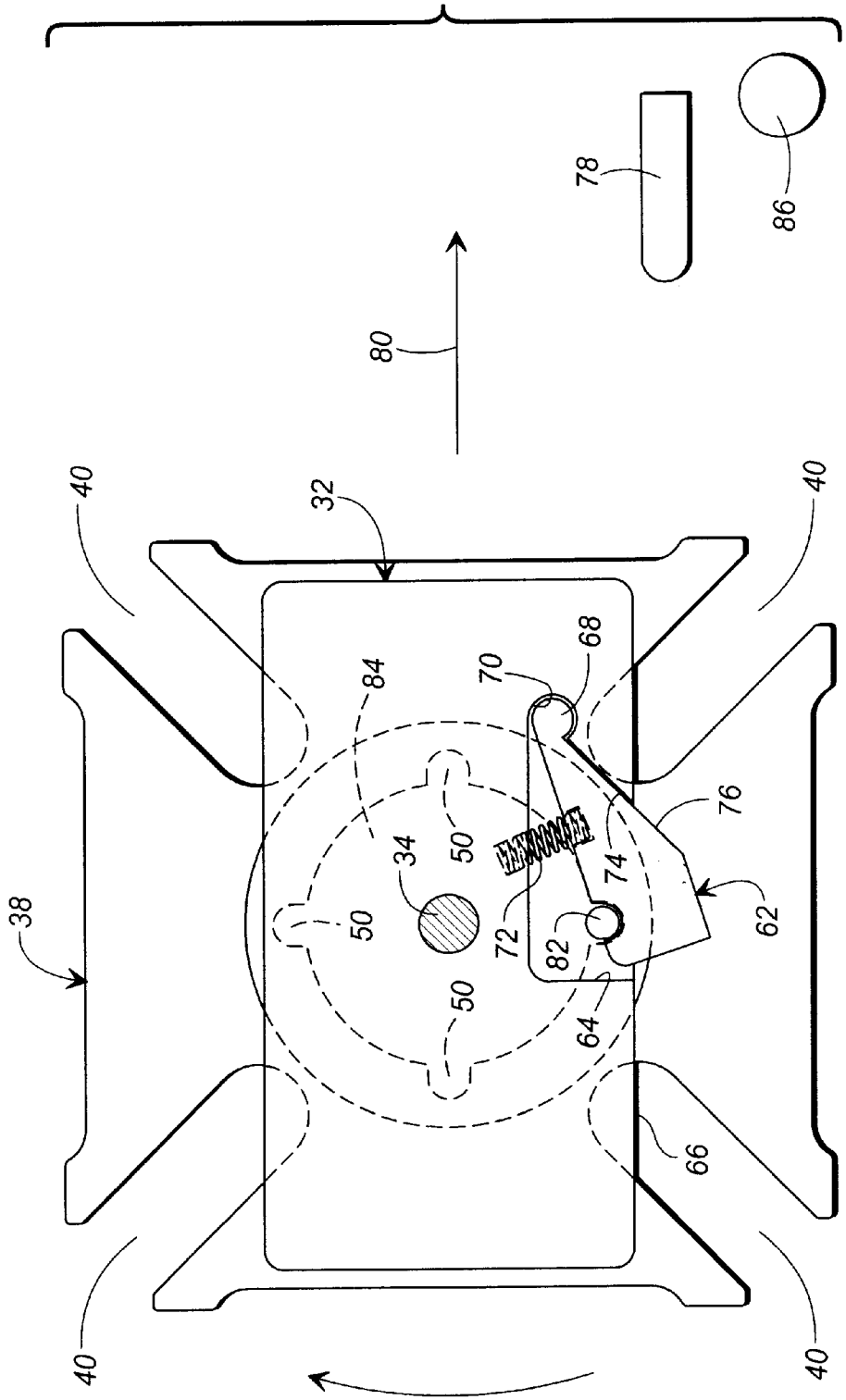
FIG. 3 is a cross sectional view, taken along lines 3—3 of FIG. 1, showing the cam lock with its locking pin in registration with a locking notch of the turning gear.

As illustrated in FIG. 3, when the hanger support 32 and rotatable bird hanger 30 advance in the direction of arrow 80, the hanger support 32 will move adjacent a cam 78, and one of the turning recesses 40 at a corner of the turning gear 38 will engage and be turned by a stationary turning pin 86. As the hanger support moves adjacent the cam 78, the cam 78 engages the cam engagement surface 76 of the cam lock 62, causing the cam lock to pivot about its semi-cylindrical pivot end 68 which is retained in position in the cam lock recess 64 by the similarly shaped semi-cylindrical recess 70. This moves the lock pin 82 out of engagement of one of the lock notches 50, so that turning gear 38 is free to rotate with and about the vertical support stem 34. As the turning gear rotates or "walks over" the turning pin 86, another one of the lock notches 50 will move into registration with lock pin 82, When the cam lock 62 moves beyond cam 78, cold compression spring 72 will move the cam lock 62 and its lock pin 82 outwardly, until lock pin 82 registers with a lock notch 50. The stop surface 74 of the cam lock recess 64 keeps the cam lock from escaping from cam lock recess 64. Likewise, when lock pin 82 is received in a lock notch 50, the cam lock will be restrained from moving further outwardly of the cam lock recess.

The lock notches 50 are deep enough and their side surfaces are formed so that the turning gear 38 will not be permitted to turn in response to the normal forces applied to the hanger 30 due to the different functions being performed on the work product carried by the hanger.

It will be understood by those skilled in the art that while the present invention has been disclosed with reference to preferred embodiments, various modifications, changes and additions can be made thereto without departing from the spirit and scope of the invention as set forth in the following claims.

What is claimed is:

1. A carrier assembly for a suspended conveyor line comprising:
    a plurality of trolley assemblies for movement along a conveyor rail;
    a conveyor chain connected between said trolley assemblies for pulling said trolley assemblies in series along said rail;
    a plurality of hanger assemblies suspended in spaced series along said conveyor chain, each hanger assembly including a hanger support and a hanger rotatably suspended from the hanger support;
    a turning gear mounted to each of said hangers;
    each turning gear including a lock collar, with lock notches formed at intervals about said lock collar,
    a cam lock movably supported by said hanger support and including a lock pin engagable with said lock notches; and
    a first cam positioned along the conveyor line for engaging said cam lock and for releasing said lock pin from one of said lock notches and permitting the hanger to rotate with respect to said hanger support such that said lock pin can engage others of said lock notches.

2. The carrier assembly of claim 1, further comprising:
    turning recesses formed at intervals about said turning gear; and
    a second cam positioned along the conveyor line for engaging one of said turning recesses for rotating the hanger with respect to said hanger support such that said first cam engages said cam lock and releases the lock pin from a lock notch, said second cam engages a turning recess, thereby causing the hanger and its lock ring to rotate, then said first cam disengages said cam lock, thereby allowing said hanger and lock collar to rotate until the lock pin captures a subsequent lock notch and retains the position of the hanger relative the hanger support.

3. A rotary shackle for use along a poultry processing path, wherein a plurality of said rotary shackles are suspended in spaced series along a conveyor chain driven along the processing path, said rotary shackle comprising:
    a hanger support configured such that said support rigidly attaches to a conveyor chain;
    a hanger rotatably suspended from said hanger support;
    a turning gear mounted to said hanger, said turning gear having lock notches formed at intervals thereabout; and
    a cam lock supported by said hanger support and including a lock pin engagable with said lock notches such that a first cam positioned along a processing path engages said cam lock, thereby releasing said lock pin from a first notch and permitting said hanger to rotate with respect to said hanger support so that said lock pin can engage a second lock notch and securely retain the position of said hanger relative to said hanger support.

4. The rotary shackle of claim 3, further comprising:
    turning recesses formed at intervals about said turning gear such that a second cam positioned along the processing path engages one of said turning recesses, thereby rotating said hanger with respect to said hanger support after said first cam engages said cam lock and releases said lock pin from said first lock notch.

5. The rotary shackle of claim 4, wherein said lock notches are formed at 90° intervals about said turning gear such that said hanger is securely retainable in four rotational positions relative said hanger support.

6. The rotary shackle of claim 5, wherein said lock pin is spring biased to engage a lock notch.

7. The rotary shackle of claim 6, wherein said turning recesses are formed at 90° intervals about said turning gear.

8. A rotary shackle for use along a poultry processing path, wherein a plurality of said rotary shackles are suspended in spaced series along a conveyor chain driven along the processing path, said rotary shackle comprising:
    a hanger support configured for rigid attachment to a conveyor chain;
    a hanger rotatably suspended from said hanger support, and;
    said hanger support including locking means for engaging and releasably locking said hanger relative to said hanger support, such that a first cam positioned along a processing path engages said locking means, thereby releasing said locking means and permitting said hanger to rotate from a first position with respect to said hanger support so that said locking means can securely retain said hanger in a second position with respect to said hanger support.

9. The rotary shackle of claim 8, wherein said hanger has a turning gear mounted thereto, said turning gear having lock notches formed at intervals thereabout and wherein said locking means is a cam lock supported by said hanger support, said cam lock having a lock pin engagable with said lock notches such that a first cam positioned along a processing path engages said cam lock, thereby releasing said lock pin from a first notch and permitting said hanger to rate from a first position with respect to said hanger support so that said lock pin can engage a second lock notch and securely retain said hanger in a second position with respect to said hanger support.

10. A method for orienting poultry carcasses for processing, said method comprising the steps of:
  providing a processing path;
  driving a conveyor chain along the path;
  carrying hanger assemblies in series along said conveyor chain;
  rotatably supporting a bird hanger with respect to a hanger support of each hanger assembly;
  suspending a poultry carcass from each bird hanger;
  locking each bird hanger in a first position relative to its hanger support with a cam actuated lock;
  sequentially engaging the cam actuated lock at intervals along the path to unlock the bird hangers from the hanger supports;
  rotating each hanger through a predetermined arc relative to its hanger support to a second position while the cam lock is engaged; and
  then locking each hanger in said second position such that the carcass is positioned for processing.

* * * * *